R. F. CLINE.
TRACTOR.
APPLICATION FILED APR. 8, 1919.

1,326,847.

Patented Dec. 30, 1919.
2 SHEETS—SHEET 1.

Inventor
Robert F. Cline
by Westall and Wallace
his Attorneys

R. F. CLINE.
TRACTOR.
APPLICATION FILED APR. 8, 1919.
1,326,847.
Patented Dec. 30, 1919.
2 SHEETS—SHEET 2.
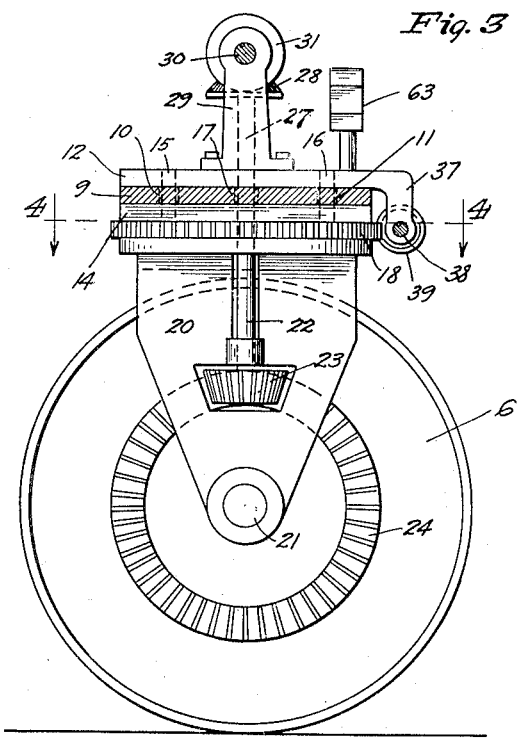
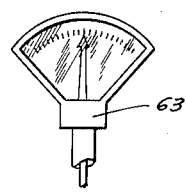
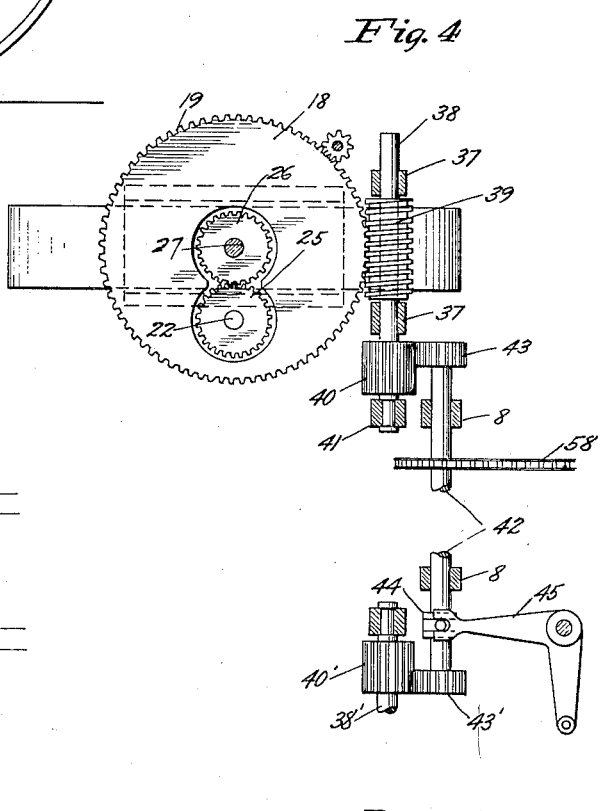
Inventor
Robert F. Cline
by Westall and Wallace
his Attorneys

UNITED STATES PATENT OFFICE.

ROBERT F. CLINE, OF LOS ANGELES, CALIFORNIA.

TRACTOR.

1,326,847.	Specification of Letters Patent.	Patented Dec. 30, 1919.

Application filed April 8, 1919. Serial No. 288,547.

*To all whom it may concern:*

Be it known that I, ROBERT F. CLINE, a citizen of the United States, residing at Los Angeles, in the county of Los Angeles and State of California, have invented new and useful Improvements in Tractors, of which the following is a specification.

This invention relates to a tractor and pertains especially to a tractor adapted for use in connection with farm implements.

The invention relates more specifically to a unitary structure, which, can be mechanically combined with a second unitary structure, such as a farm implement, to form a combination structure adapted to perform certain functions.

The principal objects of this invention are first, to provide a tractor which can make short turns, an implement to which it is connected forming the pivot point; and second, to provide a tractor which has an adjustable wheel gage so that it may be accommodated to agricultural work having furrows and rows of different distances apart. In addition to the principal objects of my invention, there are certain features of design, whereby a simple, durable, compact and easily handled tractor is obtained.

Figure 1:
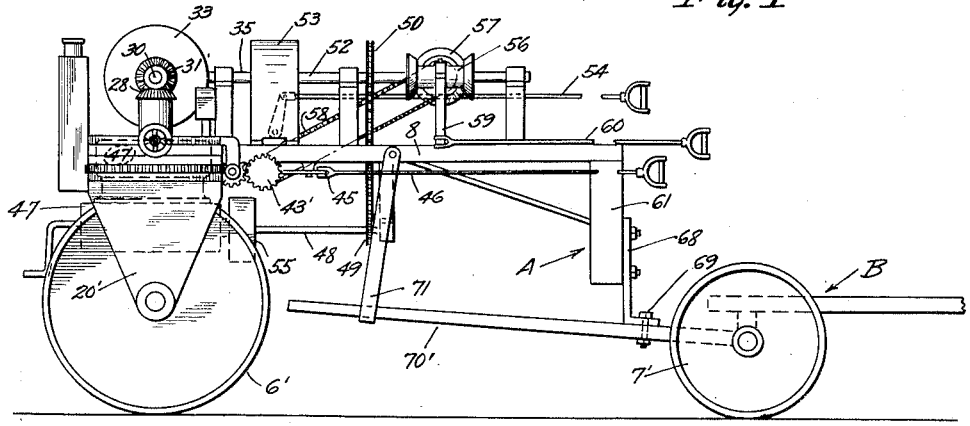
Figure 2:
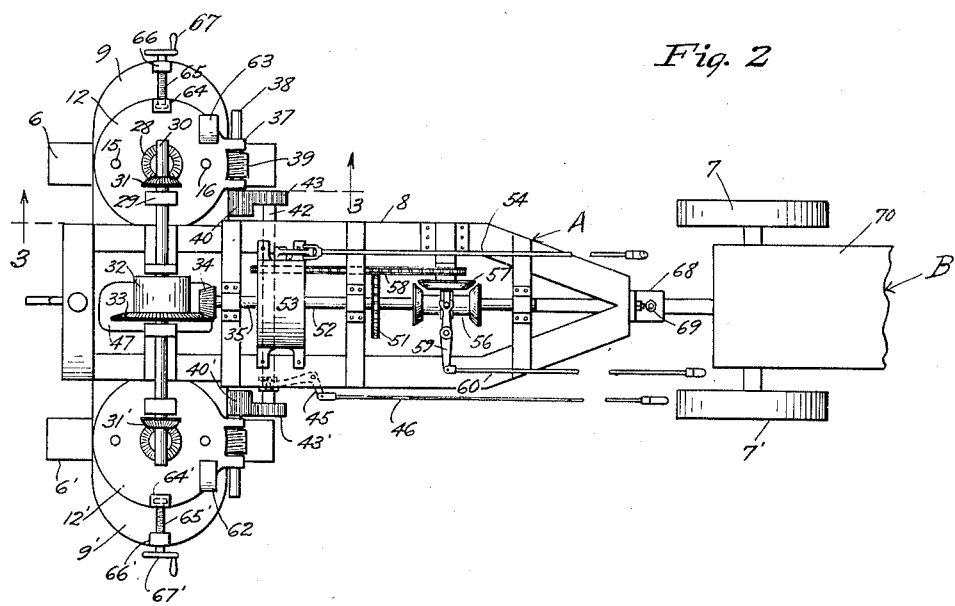

These objects will be more fully understood, as will also other objects and corresponding accomplishments of my invention from the following detailed description of a preferred embodiment thereof. For the purpose of this description, reference is had to the accompanying drawing, in which:

Figure 1 is a side elevation of a tractor embodying the invention; Fig. 2 is a plan view of Fig. 1; Fig 3 is a section taken on the line 3—3 of Fig. 2; Fig. 3ª is a face view of a steering dial; Fig. 4 is a section taken on the line 4—4 of Fig. 3; and Fig. 5 is a diagrammatic view showing the position of the wheels in turning.

Referring more particularly to Figs. 1 and 2, the tractor A having driving and steering wheels 6 and 6' is supported at its rear upon a structure B having wheels 7 and 7'. The structure B may be removed and other structures substituted therefor, such as any of the well known agricultural implements.

The tractor has a frame 8. At the forward end of the frame and extending laterally thereof are ways 9 and 9'. The ways are here shown as plates and are the portions of the frame supporting the driving wheels. As the plates and driving wheel structures, one on each side are similar in construction, it will be sufficient to describe one. Plate 9 has two parallel slots 10 and 11 extending transverse to the frame and slidably mounted upon the upper face of plate 9 is a plate 12, and slidably mounted below plate 9 is a plate 14. Plates 12 and 14 are secured together by pins 15 and 16, which extend through the slots 10 and 11. Plate 9 is also provided with a slot 17 for the passage therethrough of a shaft.

Rotatably mounted upon plate 14 is a turn table 18 having teeth 19 on the periphery thereof. A fork 20 supports a shaft 21 upon which drive wheel 6 is mounted. A shaft 22 is rotatably mounted on the fork and has a bevel gear 23 meshing with a set of teeth 24 on wheel 6.

On the upper end of shaft 22 is a pinion 25 meshing with a gear 26 secured to a shaft 27. Shaft 27 is at the center of turn table 18 and serves as a pivot pin upon which the latter and wheel 6 turns. Upon the upper end of shaft 27 is a bevel gear 28. Mounted upon plate 12 is a pedestal 29 in which is journaled a divided shaft 30. Splined upon shaft 30 is a bevel gear 31 meshing with bevel gear 28. A differential 32 is connected to shaft 30 and is driven by a bevel gear 34 mounted on a shaft 35.

Formed on the edge of plate 12 is a bracket 37, in which is slidably journaled a shaft 38. Splined upon shaft 38 is a worm gear 39. Fixed to shaft 38 is a wide pinion 40. One end of shaft 38 is fixed to the frame 8 against longitudinal movement by being journaled in a bearing 41. Thus, upon rotating shaft 38 motion is conveyed to worm 39 turn table 18 and to the wheel 6 to turn the latter and thereby steer the tractor. A gear 40' is mounted upon a shaft 39' which conveys motion to the turn table connected to wheel 6'. Journaled in the frame 8 is a shaft 42. Fixed to one end of the shaft and adapted to mesh with pinion 40 is a pinion 43 and secured to the other end of shaft 42 and meshing with pinion 40' is a pinion 43'. Shaft 42 is not only journaled in the frame but can be moved longitudinally, so that either pinion 43 may be thrown out of gear with pinion 40 or pinion 43' with pinion 40'. In the position shown in Fig. 4 pinions 43 and 43' are in mesh with their corresponding pinions on shaft 42 and both wheels would be moved at the same time. In order to move only one of the wheels, shaft 42 is moved to throw either the pinion 43 or 43′ out of mesh with its corresponding pinion 40 or 40′ depending upon which wheel is not to be moved. In order to accomplish this movement a collar 44 is placed upon shaft 42 and a bell crank 45 having a fork at one end secured to the collar 44 is mounted upon the frame. Secured to the bell crank 45 is a link 46 extending to the rear of the tractor and provided with convenient means for its operation. A handle is shown upon the end of link 46 for operating the same. This handle is shown merely for illustrative purposes as any other suitable means of sliding shaft 42 may be used.

Mounted upon the forward part of the frame is an engine 47 provided with a shaft 48 extending toward the rear of the frame. Mounted upon the shaft 48 is a sprocket wheel 49. A chain 50 gears sprocket wheel 49 to a sprocket wheel 51 fixed to shaft 52. A clutch 53 connects shaft 35 and may be operated by suitable linkage 54. Between the engine and shaft 48 is transmission gearing of any suitable character indicated generally by 55.

Mounted upon shaft 52 is a double bevel friction gear 56. Gear 56 is splined to shaft 52. Journaled on the frame 8 is a bevel friction gear 57 arranged to be engaged by either half of the bevel gear 56. Secured to the shaft, upon which is mounted the gear 57, is a sprocket wheel geared by a chain 58 to a sprocket wheel on shaft 42. This provides for steering of the tractor by means of power. A shifting lever 59 is connected to the gear 56 so that the gear may be moved upon shaft 52 and rotate gear 57 in either direction. A link 60 is connected to lever 59 and extends to a point at the rear of the machine convenient for manipulation by the driver.

Referring to Fig. 5 a diagrammatic view illustrates the method employed to turn the tractor. When the end of a furrow has been reached and it is desired to turn about, link 60 is operated to turn both wheels as indicated by the full lines in Fig. 5. The power is then thrown off shaft 52 by moving gear 56 to neutral position. Link 46 is now operated to cause pinion 43 to be thrown out of mesh with pinion 40, so that upon power being applied to the steering mechanism wheel 6 will not be moved. Power is now applied to the steering mechanism and wheel 6′ is turned until it comes into the position shown in dotted lines, in which position its plane of rotation is tangent to a circle whose center is at the rear post 61 of the tractor. Likewise the plane of wheel 6 is tangent to the same circle. If power is now transmitted to the driving wheels, the tractor will turn about the rear post as an axis. After the turn has been made the wheels are straightened out by properly applying the power and the shaft 52 is again moved into neutral position, that is, with both pinions driving the steering apparatus. In order to assist the driver in properly positioning his wheels, indicators 62 and 63 may be geared to the turn tables. These indicators may be of any convenient type having hands moving over dials to indicate positions of the wheels.

In order to change the gage of the wheels, plates 12 and 12′ are moved inwardly or outwardly from the plates 9 and 9′ respectively. During said movement bevel gears 31 and 31′ slide upon the divided shaft 30. A convenient means for making such adjustment consists in a pedestal 64 mounted on plate 12, to which a screw 65 is rotatably secured but prevented from moving longitudinally. A pedestal 66 is provided with a screw thread, with which meshes the threads on screw 65. A handle 67 is secured to the end of screw 65, so that by rotating the handle wheel 6 may be moved to or from the center of the tractor. Wheel 6′ is provided with similar mechanism indicated by corresponding reference numerals 64′, 65′, 66′ and 67′.

At the rear of the tractor frame is the post 61, to which is secured the vertically adjustable bracket 68 providing for changing the effective length of the post. The horizontal leg of bracket 68 is provided with a hole through which may be passed a coupler pin 69.

The structure B shown herein is merely a truck having a bed 70 to the front of which is connected a double-tree and a tongue. The pin 69 slips through the hole for the coupler pin of the double-tree. The pole 70′ hangs in a cradle 71 secured to the frame 9, so that the weight of the rear of the tractor rests on the running gear of the truck. It is obvious that any agricultural implement may be substituted for the truck. The tractor may be equipped with various accessories to make this operation convenient. Furthermore, I do not limit myself to the precise mechanical details of the various elements. These may be changed as found expedient.

What I claim is:

1. A tractor having a frame provided with ways extending laterally from the sides thereof, supporting plates slidably mounted on said ways for changing the gage of the tractor wheels, wheel frames, one pivotally mounted on each of said plates, driving shafts for said wheels in axial alinement with the pivotal axes of said wheel frames, said driving shafts being geared to said wheels and having driven gears adjacent to said plates, driving gears splined on a drive shaft and in mesh with said driven gears, steering gears secured to said wheel frames, and a slidable shaft having pinions thereon, one in mesh with each steering gear, said pinions and steering gears being so arranged that the pinions may mesh with either or both steering gears.

2. A tractor having a frame provided with ways extending laterally from the sides thereof, supporting plates slidably mounted on said ways for changing the gage of the wheels, wheel frames, one pivotally mounted on each of said plates, driving shafts for said wheels in axial alinement with the pivotal axes of said wheel frames, said driving shafts being geared to said wheels and having driven gears adjacent to said plates, driving gears splined on a drive shaft and in mesh with said driven gears, steering gear secured to said wheel frames operable to turn both wheels simultaneously or either wheel.

3. A tractor having a frame provided with ways extending laterally from the sides thereof, supporting plates slidably mounted on said ways for changing the gage of the wheels, wheel frames, one pivotally mounted on each of said plates, driving shafts for said wheels in axial alinement with the pivotal axes of said wheel frames, said driving shafts being geared to said wheels and having driven gears adjacent to said plates, driving gears splined on a drive shaft and in mesh with said driven gears.

4. A tractor having a frame, wheels pivotally secured thereto, steering gears for turning said wheels, one connected to each wheel, and a slidable shaft having pinions thereon, one each in mesh with a gear, said pinions and gears being so arranged that the pinions may mesh with either or both gears.

5. A tractor having a frame, wheels pivotally secured thereto, steering gears for turning said wheels, one connected to each wheel, and slidable pinions connected with said gears, so that either or both of said wheels may be turned.

6. A tractor having a frame, wheels pivotally secured thereto, and steering gears engageable with both wheels to turn the same simultaneously or engageable with either wheel.

7. A tractor comprising a frame, driving wheels adjustably mounted thereon so that the gage between wheels may be changed, and propelling means on said frame continuously geared to said wheels to permit change of the gage.

In witness that I claim the foregoing I have hereunto subscribed my name this 2nd day of April, 1919.

ROBERT F. CLINE.